United States Patent Office 3,528,814
Patented Sept. 15, 1970

3,528,814
SENSITIZATION OF LIGHT-SENSITIVE POLYMERS
Oskar Riester, Leverkusen, Justus Danhäuser and Hans Öhlschläger, Cologne-Stammheim, Eckart Seelig, Leverkusen, and Willibald Pelz, Opladen, Germany, assignors to Agfa-Gevaert Aktiengesellschaft, Leverkusen, Germany, a corporation of Germany
No Drawing. Filed Apr. 14, 1967, Ser. No. 630,837
Claims priority, application Germany, Apr. 29, 1966, A 52,306
Int. Cl. G03c 1/52, 1/68
U.S. Cl. 96—115          6 Claims

ABSTRACT OF THE DISCLOSURE

Polymers that cross link on exposure to light require less exposure when mixed with a compound having the formula:

[chemical structure]

wherein:

Z=the ring members necessary for completing a thiazole, benzothiazole, naphthothiazole, selenazole, benzoselenazole or naphthoselenazole ring;
Y=the ring members necessary for completing a thiobarbituric acid ring;
R=alkyl having preferably up to 5 carbon atoms, an olefinically unsaturated aliphatic radical having up to 5 carbon atoms such as allyl, aryl preferably phenyl, or aralkyl preferably benzyl or phenylethyl, or alkyl having preferably up to 5 carbon atoms and substituted with at least one of the following substituents: carboxyl, sulfo, sulfonamide, sulfate or phosphoric acid;

and the rings may be further substituted.

---

The present invention relates to the sensitization of light-sensitive polymers for use in photographic reproduction.

It is well known in the art of photomechanical reproduction to utilize light-sensitive polymers for forming resist images. These polymers are applied as a thin layer to a suitable support, which after exposure may be selectively dissolved in the unexposed areas by development with a solvent while the exposed and changed image parts of the layer remain insoluble in the solvent. Such light-sensitive synthetic resins contain light-sensitive groups such as cinnamic acid, azido or sulfazide groups.

It is also known that the light-sensitivity of these synthetic resins can be greatly enhanced by using such sensitizers as triphenylmethane dyes, aromatic ketones, or nitro compounds.

The object of the invention is to provide new sensitizers and to increase as much as possible the light-sensitivity of synthetic resins which undergo cross-linking on exposure to light.

We now have found that the light-sensitivity of synthetic resins which undergo cross-linking upon exposure, can be greatly increased by a sensitizer of the following formula:

[chemical structure]

wherein:

Z=the ring members necessary for completing a ring of the following group: thiazole, benzothiazole, naphthothiazole, selenazole, benzoselenazole or naphthoselenazole;
Y=the ring members necessary for completing a thiobarbituric acid ring and
R=alkyl having preferably up to 5 carbon atoms, aryl, preferably phenyl, or aralkyl preferably benzyl or phenylethyl or alkyl having preferably up to 5 carbon atoms which is substituted with at least one of the following substituents: carboxyl, sulfo, sulfonamide, sulfate or phosphoric acid.

The heterocyclic rings or aryl groups fused thereto, contained in the compounds of the above formula may be further substituted in any way desired, e.g. with alkyl groups having preferably up to 5 carbon atoms such as methyl or ethyl, halogens such as chlorine or bromine, alkoxy groups having preferably up to 5 carbon atoms such as methoxy or ethoxy, hydroxyalkyl, thioalkyl, aryl groups such as phenyl, or aralkyl groups such as benzyl, or amino or substituted amino groups.

The nature of these substituents is of secondary importance in connection with the sensitising effect. However, by suitable choice of substituents, other physical properties such as the solubility can be influenced as required. Preferred are compounds of the following formula:

[chemical structure]

wherein Z and R have the meanings indicated above and $R_1$ or $R_2$ represents hydrogen, alkyl having up to 5 carbon atoms such as methyl or ethyl, an olefinically unsaturated aliphatic radical having up to 5 carbon atoms such as allyl, or phenyl.

Particularly suitable are, for example, compounds of the following formulae:

(1) [chemical structure]

(2) [chemical structure]

(3) [chemical structure]

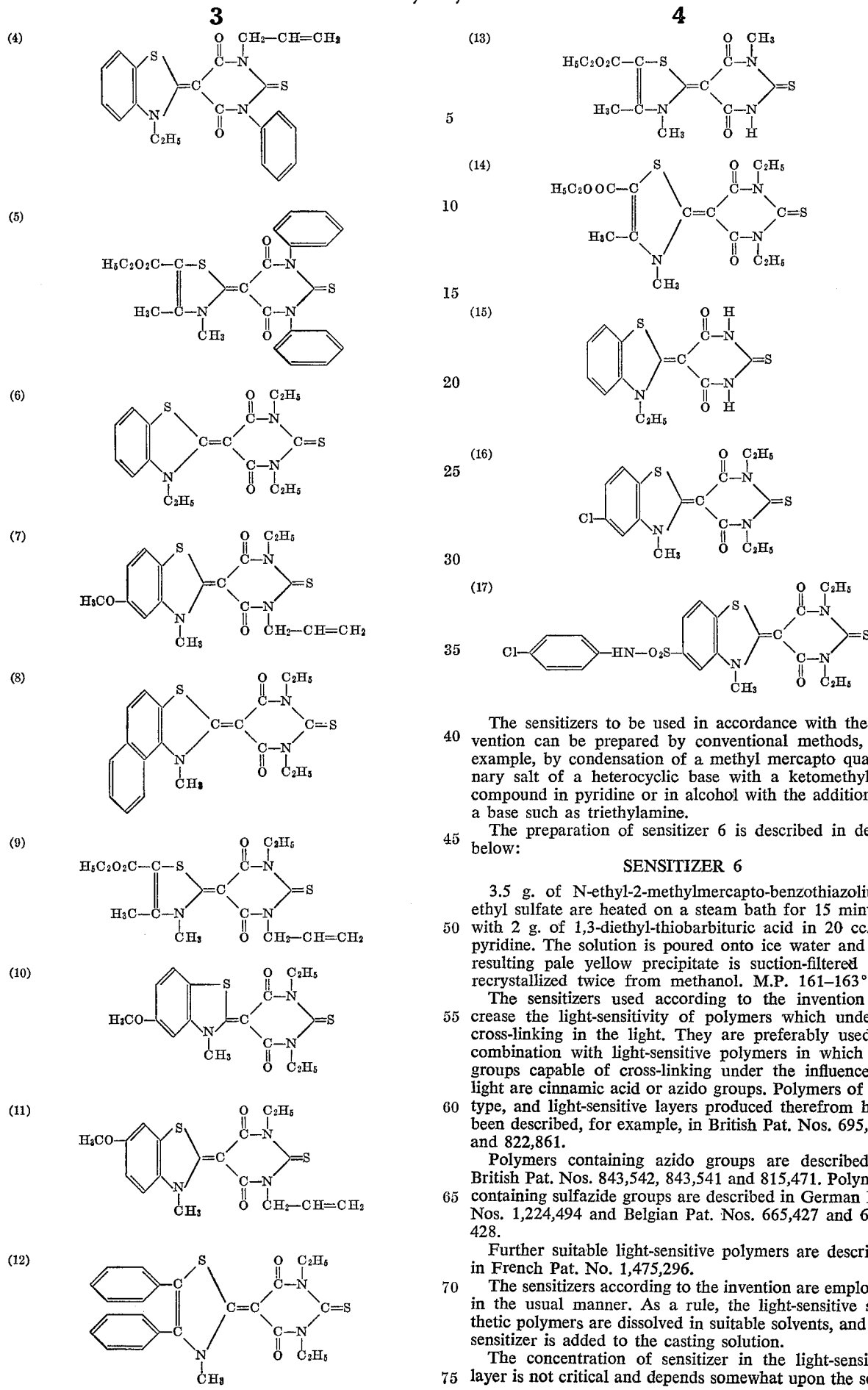

The sensitizers to be used in accordance with the invention can be prepared by conventional methods, for example, by condensation of a methyl mercapto quaternary salt of a heterocyclic base with a ketomethylene compound in pyridine or in alcohol with the addition of a base such as triethylamine.

The preparation of sensitizer 6 is described in detail below:

SENSITIZER 6

3.5 g. of N-ethyl-2-methylmercapto-benzothiazolium-ethyl sulfate are heated on a steam bath for 15 minutes with 2 g. of 1,3-diethyl-thiobarbituric acid in 20 cc. of pyridine. The solution is poured onto ice water and the resulting pale yellow precipitate is suction-filtered and recrystallized twice from methanol. M.P. 161–163° C.

The sensitizers used according to the invention increase the light-sensitivity of polymers which undergo cross-linking in the light. They are preferably used in combination with light-sensitive polymers in which the groups capable of cross-linking under the influence of light are cinnamic acid or azido groups. Polymers of this type, and light-sensitive layers produced therefrom have been described, for example, in British Pat. Nos. 695,197 and 822,861.

Polymers containing azido groups are described in British Pat. Nos. 843,542, 843,541 and 815,471. Polymers containing sulfazide groups are described in German Pat. Nos. 1,224,494 and Belgian Pat. Nos. 665,427 and 645,-428.

Further suitable light-sensitive polymers are described in French Pat. No. 1,475,296.

The sensitizers according to the invention are employed in the usual manner. As a rule, the light-sensitive synthetic polymers are dissolved in suitable solvents, and the sensitizer is added to the casting solution.

The concentration of sensitizer in the light-sensitive layer is not critical and depends somewhat upon the solu- $R_1$ and $R_2$ = hydrogen, alkyl having up to 5 carbon atoms, an olefinically unsaturated aliphatic radical having up to 5 carbon atoms or phenyl;

said polymer being capable of undergoing cross-linking upon exposure.

3. The composition of claim 2, wherein the sensitizer has the following formula:

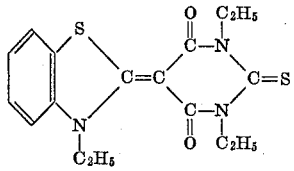

4. The composition of claim 2, wherein the sensitizer has the following formula:

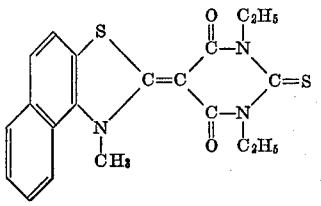

5. The composition of claim 2, wherein the sensitizer has the following formula:

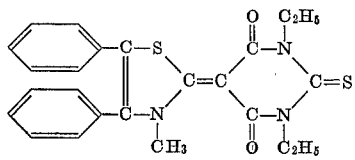

6. The composition of claim 2, wherein the sensitizer has the following formula:

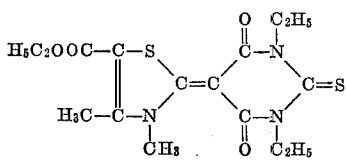

References Cited

UNITED STATES PATENTS 2,732,301  1/1956  Robertson et al. _____ 96—115
3,173,787  3/1965  Clement et al. _____ 96—115 XR RONALD H. SMITH, Primary Examiner U.S. Cl. X.R.

96—91, 35.1 bility of the sensitizing agent in the particular solvent used in the light-sensitive polymer of the final layer. A required concentration depends furthermore on the original sensitivity of the light-sensitive polymer and to some extent on the thickness of the final layer, a slightly lower concentration usually being employed in the case of thicker layers in order to ensure thorough hardening of the layer.

The optimum concentration can be determined in known manner by a few simple tests customarily employed in the art. Generally a concentration of about 0.5 to 10% preferably 1 to 7% by weight is sufficient.

The sensitized layers of the present invention are processed in accordance with common practice. The sources of light employed are preferably high-energy carbon arc lamps or mercury vapour lamps. After exposure, the layer is developed in known manner by dissolving out the unexposed parts of the layer. Suitable solvents and solvent concentrations for the coating compositions and for developing the exposed sensitive layers of the invention can be selected from those set forth in the patent specifications mentioned hereinbefore. The relief images obtained can then be used in the usual ways.

EXAMPLE 1

4 g. of a reaction product of 1 part of ethylene-vinyl alcohol copolymer and 2 parts of m-isocyanato-cinnamic acid ethyl ester (see British Pat. No. 822,861) and 0.04 g. of sensitizer No. 12 are dissolved in 46 g. butyl acetate. An aluminum foil is coated with the solution in a centrifuge (100 revolutions per minute) and dried for 5 minutes.

The layer is exposed for 5 minutes behind a grey step wedge with a carbon arc lamp (30 a., 42 v.) at a distance of 70 cm. and developed for 2 minutes in butyl acetate which contains 0.1% Irisolechtblau BLE (CIS591). The layer is washed with water and dried in air. 9 steps of the grey wedge are visible on the support.

If the layer is exposed under the same conditions without the addition of sensitizer, then only 2 steps of the grey wedge are visible. Density of step 2: 0.17, step 9: 1.23. This corresponds to an 11.5-fold increase in sensitivity by the addition of sensitizer.

The increase in sensitivity obtained when other sensitizers according to the invention are used instead of sensitizer 12, are as shown in the following table:

| Sensitizer No.: | Relative sensitivity |
| --- | --- |
| 1 | 11.3 |
| 2 | 11.3 |
| 3 | 11.3 |
| 4 | 11.3 |
| 5 | 11.3 |
| 7 | 16.5 |
| 8 | 17 |
| 9 | 10 |
| 10 | 11.7 |
| 11 | 16.5 |
| 12 | 11.5 |
| 14 | 17 |
| 16 | 11.3 |
| 17 | 16.5 |
| Michler's ketone | 7.5 |

The sensitivity of the sensitized layer compared with that of the non-sensitized layer is calculated from the number of colored steps of the layer remaining on the support according to the equation:

$$Sx = \frac{\text{antilog } Dx}{\text{antilog } Do}$$

where $Dx$ is the density of the last step of the sensitized layer still adhering to the support, and $Do$ is the density of the last step of the non-sensitized layer still found on the support.

EXAMPLE 2

The procedure carried out is the same as that described in Example 1, except that instead of light-sensitive polymer used in Example 1, a polymer which has been obtained by reacting 10 g. of a copolymer of vinyl chloride and vinyl alcohol with 7.3 g. of p-azidobenzoyl chloride in pyridine (see also British Pat. No. 843,541) is applied.

The increase of sensitivity is shown in the following table:

| Sensitizer No.: | Relative sensitivity |
| --- | --- |
| 6 | 35 |
| 8 | 35 |
| 14 | 35 |

EXAMPLE 3

The procedure is performed as described in Example 1. The light-sensitive polymer used is that indicated in Example 7 of German Pat. No. 1,224,494.

The effect of the sensitizers according to the invention is illustrated by the table below.

| Sensitizer No.: | Relative sensitivy |
| --- | --- |
| 1 | 3.5 |
| 10 | 5.5 |
| 11 | 4.6 |
| 13 | 8 |
| 15 | 11.8 |
| 16 | 8 |

What is claimed is:

1. A composition comprising a light-sensitive film-forming polymer selected from the group consisting of polymers containing cinnamic acid groups or azide groups and a sensitizing amount of a sensitizer of the following formula:

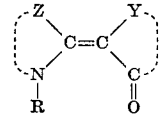

wherein:
Z = the ring members necessary for completing a ring of the following group: thiazole, benzothiazole, naphthothiazole, selenazole, benzoselenazole or napthoselenazole;
Y = the ring members necessary for completing a thiobarbituric acid ring and
R = alkyl, aryl or aralkyl or alkyl which is substituted with at least one of the following substituents: carboxyl, sulfo, sulfonamide, sulfate or phosphoric acid;
said polymer being capable of undergoing cross-linking upon exposure.

2. A composition comprising a light-sensitive film-forming polymer selected from the group consisting of polymers containing cinammic acid groups or azide groups and a sensitizing amount of a sensitizer of the following formula:

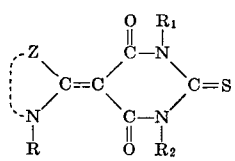

wherein:
Z = the ring members necessary for completing a ring of the following group: thiazole, benzothiazole, naphthothiazole, selenazole, benzoselenazole or naphtoselenazole;
R = alkyl having up to 5 carbon atoms, phenyl or alkyl having up to 5 carbon atoms which is substituted with at least one of the following substituents: carboxyl, sulfo, sulfonamide, sulfate or phosphoric acid;

PO-1050
(5/69)

UNITED STATES PATENT OFFICE
CERTIFICATE OF CORRECTION

Patent No. 3,528,814      Dated September 15, 1970

Inventor(s) Oskar Riester et al

It is certified that error appears in the above-identified patent and that said Letters Patent are hereby corrected as shown below:

Column 2, formula (1), the right hand part of that formula should read as follows:

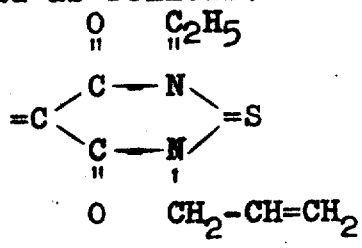

SIGNED AND
SEALED
FEB 2 1971

(SEAL)
Attest:

Edward M. Fletcher, Jr.
Attesting Officer

WILLIAM E. SCHUYLER, JR.
Commissioner of Patents